(12) United States Patent
Benisty

(10) Patent No.: US 11,409,466 B2
(45) Date of Patent: Aug. 9, 2022

(54) ACCESS CONTROL IN CMB/PMR VIRTUALIZATION ENVIRONMENT

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/776,198

(22) Filed: Jan. 29, 2020

(65) Prior Publication Data

US 2021/0232338 A1 Jul. 29, 2021

(51) Int. Cl.
*G06F 3/06* (2006.01)
*G06F 9/54* (2006.01)
*G06F 9/46* (2006.01)

(52) U.S. Cl.
CPC .......... *G06F 3/0659* (2013.01); *G06F 3/0611* (2013.01); *G06F 3/0658* (2013.01); *G06F 3/0664* (2013.01); *G06F 3/0679* (2013.01); *G06F 9/467* (2013.01); *G06F 9/546* (2013.01)

(58) Field of Classification Search
CPC ...... G06F 3/0659; G06F 3/0679; G06F 3/061; G06F 3/0658; G06F 9/546
See application file for complete search history.

(56) References Cited

U.S. PATENT DOCUMENTS

| 9,201,777 | B2 | 12/2015 | Hsu et al. | |
| 2014/0282514 | A1 | 9/2014 | Carson et al. | |
| 2016/0004438 | A1* | 1/2016 | Moon | G06F 3/0631 |
| | | | | 711/103 |
| 2017/0262365 | A1* | 9/2017 | Kanno | G06F 12/06 |
| 2018/0341410 | A1 | 11/2018 | Benisty | |
| 2019/0065102 | A1 | 2/2019 | Shin et al. | |
| 2019/0146684 | A1 | 5/2019 | Benisty et al. | |

FOREIGN PATENT DOCUMENTS

WO 2018201249 A1 11/2018

* cited by examiner

*Primary Examiner* — Ernest Unelus
(74) *Attorney, Agent, or Firm* — Patterson + Sheridan, LLP; Steven H. Versteeg

(57) ABSTRACT

In one embodiment, a method provides access to a data storage device from a host coupled to the data storage device. The host is running a plurality of virtual functions. The method includes receiving an inbound request to a memory of a storage device controller of the data storage device. The memory of the storage device controller includes a DRAM memory and a non-DRAM memory. Whether the inbound request is a CMB/PMR transaction request is determined. The CMB/PMR transaction request is scheduled. Whether the scheduled CMB/PMR transaction request is allowed is determined. The allowed CMB/PMR transaction request is issued toward the DRAM memory of the storage device controller.

14 Claims, 5 Drawing Sheets

ACCESS CONTROL IN CMB/PMR VIRTUALIZATION ENVIRONMENT

BACKGROUND OF THE DISCLOSURE

Field of the Disclosure

Embodiments of the present disclosure generally relate to data storage devices, such as nonvolatile memory devices, configured for use in virtualized computing environments.

Description of the Related Art

NVM Express (NVMe) is an interface protocol between a host and a data storage device, such as a solid state drive (SSD), for accessing data stored in the data storage device. The NVMe protocol is based on a paired submission queue and completion queue mechanism. Commands, such as read commands and write commands, are placed by host software into a submission queue and are fetched by the data storage device for execution. Completions are placed into the associated completion queue by storage device controller to notify the host of completion of the commands.

In general, submission queues and completion queues are allocated in host memory, such as in host DRAM. The NVMe protocol has introduced a controller memory buffer (CMB) feature that enables NVMe data structures, such as submission queues, completion queues, PRP lists, SGL segments, and data buffers to be stored in data storage device memory, such as in storage device DRAM.

However, current NVMe storage devices with the CMB feature may suffer from degraded quality of service when implemented in virtualization environments, such as with a plurality of virtualized hosts, due to overloading the storage device DRAM. Therefore, an improved NVMe storage device providing CMB capability is needed for implementation in a virtualization environment.

SUMMARY OF THE DISCLOSURE

In one embodiment, a method provides access to a data storage device from a host coupled to the data storage device. The host is running a plurality of virtual functions. The method includes receiving an inbound request to a memory of a storage device controller of the data storage device. The memory of the storage device controller includes a DRAM memory and a non-DRAM memory. Whether the inbound request is a CMB/PMR transaction request is determined. The CMB/PMR transaction request is scheduled. Whether the scheduled CMB/PMR transaction request is allowed is determined. The allowed CMB/PMR transaction request is issued toward the DRAM memory of the storage device controller.

In another embodiment, a data storage device includes a PCIe interface configured to be coupled to a PCIe interface of a host running a plurality of virtual functions. The data storage device further includes a storage device controller. The storage device controller includes a memory and a memory access control module. The memory of the storage device controller includes DRAM memory and non-DRAM memory. The memory access control module is configured to receive an inbound request to the memory of the data storage device. The memory access control module is configured to determine whether the inbound request is a CMB/PMR transaction request. The memory access control module is configured to schedule the CMB/PMR transaction request. The memory access control module is configured to determine whether the scheduled CMB/PMR transaction request is allowed. The memory access control module is configured to issue the allowed CMB/PMR transaction request toward the DRAM memory.

In still another embodiment, a data storage device includes a PCIe interface configured to be coupled to a PCIe interface of a host running a plurality of virtual functions. The data storage device further includes non-volatile memory and a storage device controller. The storage device controller includes a memory and a memory access control means. The memory access control means issues CMB/PMR transaction requests to the memory in an out-of-order sequence. The memory access control means is between the PCIe interface of the data storage device and the memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a NVMe storage device controller having a memory access control module and a method of accessing a memory of a NVMe storage device having a memory access control module.

Figure 1:
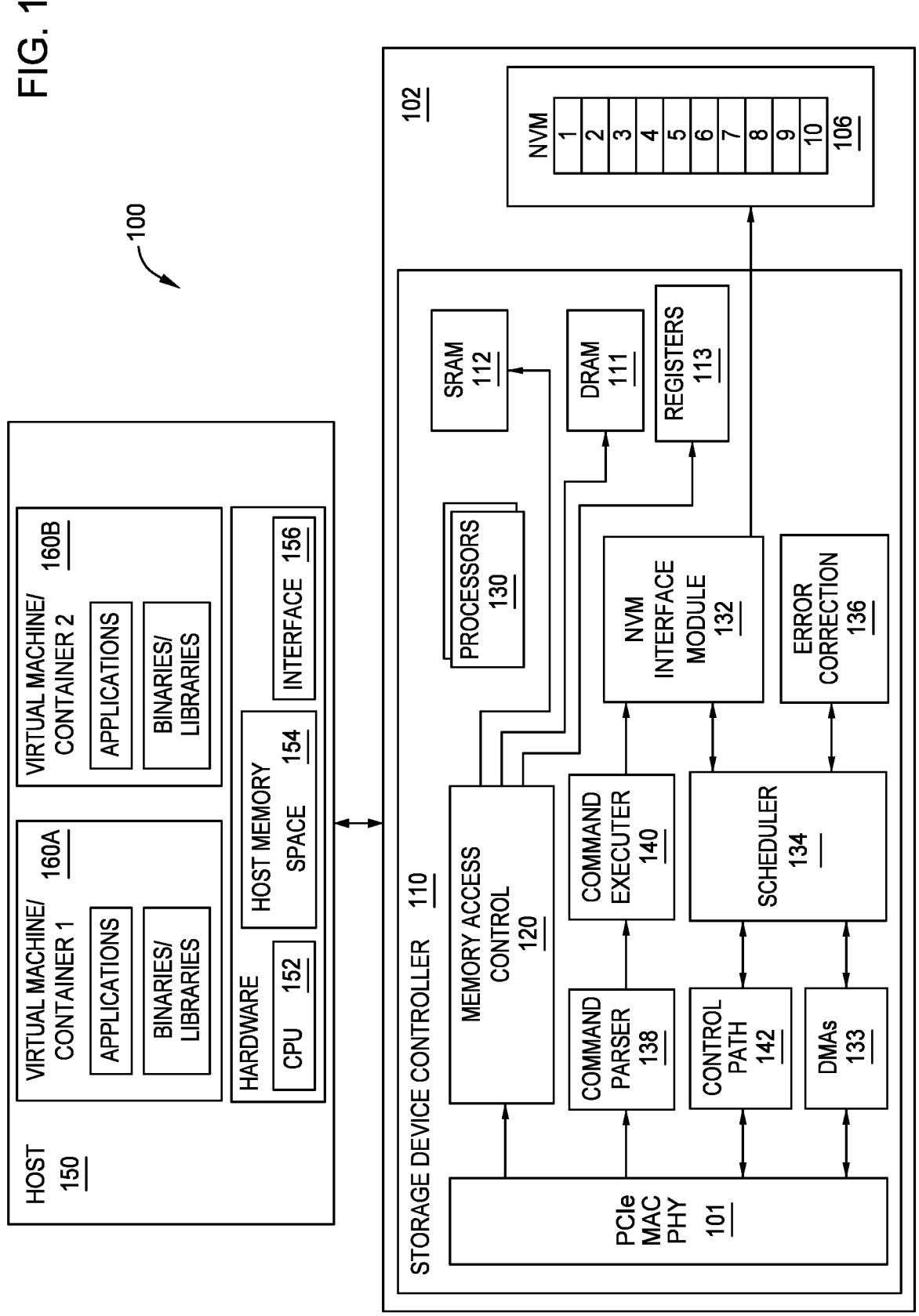
FIG. 1 is a schematic block diagram illustrating certain embodiments of a virtualized computer system including one or more hosts running one or more virtualized hosts sharing a data storage device.

FIG. 1 is a schematic block diagram illustrating certain embodiments of a virtualized computer system 100 including one or more hosts 150 running one or more virtualized hosts 160 sharing data storage device 102, such as a solid state drive (SSD). Host 150 is any computing device capable of running one or more virtualized hosts 160, such as one or more virtual machines (VMs) or one or more containers. Host 150 utilizes a non-volatile memory (NVM) 106, such as NAND flash memory, included in data storage device 102 to write and to read data, such as for long term memory storage.

Host 150 can be a hardware platform including one or more central processing units (CPUs) 152, host memory space 154, and an interface 156. Host 150 may include a wide range of devices, such as computer servers, network attached storage (NAS) units, desktop computers, notebook (e.g., laptops) computers, tablet computers (e.g., "smart" pads), mobile devices, set-top boxes, telephone handsets (e.g., "smart" phones), televisions, cameras, display devices, digital media players, video gaming consoles, video streaming devices, automotive applications (e.g., mapping, autonomous driving), or other devices capable of running one or more virtualized hosts 160. In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware. Host memory space 154 is a device allowing information, such as executable instructions, cryptographic keys, configurations, and other data, to be stored and retrieved. Host memory space 154 can be DRAM, virtual memory, other main memories, and combinations thereof.

In certain embodiments wherein host 150 is running one or more virtualized hosts 160 that are virtual machines, host 150 includes a hypervisor (not shown). The hypervisor manages multiple independent computer system emulations called virtual machines (VMs). The hypervisor can start, manage, and shut down VMs. The hypervisor manages various functional aspects of VMs, including input/output operations (IOs). The hypervisor assigns a different virtual function (VF) number(s) to each different VM. Thus, each VF number is uniquely assigned to one VM. When a VM generates a command to access data storage device 102, the hypervisor transforms the command to include the VF number assigned to the VM. The hypervisor can also set a size of DRAM 111 allocated to a particular VF and/or set a priority of a particular VF (e.g., low, medium, high, strict) during initialization of the VM. In certain embodiments wherein host 150 is running one or more virtualized hosts 160 that are containers, host 150 runs the containers without a hypervisor.

Host 150 may be implemented as a physical computing device or as a cloud instance running within a cloud environment. A cloud instance of a host is a host running within a VM, within a container, or within other virtualized hosts. For example, a cloud instance can be implemented as a nested VM with a first hypervisor running within a VM, which is running over a second hypervisor.

The interface 156 can be a network interface or a data storage device interface. Network interface enables host 150 to communicate with data storage device 102 via a communication medium, such as a network coupling host 150 and data storage device 102 within the virtualized computing system 100. Network interface may be one or more network adapters, also referred to as Network Interface Cards (NICs). Data storage device interface enables host 150 to communicate with data storage device 102 via a dedicated link.

The interface 156 of host 150 interacts with an interface 101 of the data storage device 102 for ingress and egress of communications between host 150 and data storage device 102. Interface 156 and host interface 101 operate under a communication protocol, such as a Peripheral Component Interface Express (PCIe) serial communication protocol or other suitable communication protocols. The interface 156 includes one or more ports, such as a PCIe port, an RDMA port (Ethernet, RoCE/iWARP, InfiniBand), a fibre channel port, a TCP port, or other suitable fabric ports. Devices connected to the PCIe fabric direct communications to other devices by providing a PCIe address. The fabric routes such communications to the appropriate device based on the PCIe address. One portion of the address is a device number that specifies the physical device to which a communication is to be routed.

The PCIe specification includes the concept of VFs (as opposed to physical functions). VFs represent an additional addressing parameter by which a CPU 152 may specify a subdivision of functionality within data storage device 102. Each virtualized host 160 is assigned its own set of one or more VFs to share access to data storage device 102. The assignment of separate VFs to a single virtualized host 160 allows each virtualized host 160 to independently address data storage device 102.

Host 150 and data storage device 102 can communicate over the PCIe interface through NVMe communications. NVMe communications can be by one or more of NVMe over PCIe fabrics, NVMe over non-PCIe fabrics, and/or local PCIe. NVMe over non-PCIe fabrics includes a transport abstraction layers at both sides of the fabric interfaces to translate native PCIe transactions over non-PCIe fabrics. Host 150 can be connected to the storage device 102 over a data center storage system network, an enterprise storage system network, a storage area network, a cloud storage network, a local area network (LAN), a wide area network (WAN), the Internet, other networks, wired links, wireless links, and interconnections thereof.

Data storage device 102 may be a network storage device, an internal storage drive (e.g., server computer, desktop hard drive, notebook computer), a data center storage device, an external storage device, an embedded mass storage device, a removable mass storage device, and other suitable data storage devices.

Data storage device 102 includes a storage device controller 110 which manages operations of storage device 102, such as writes to and reads from NVM 106. Storage device controller 110 may include one or more processors 130, which may be multi-core processors. Processor 130 handles the components of data storage device 102 through firmware and/or software. Processor 130 executes instructions of the computer-readable program code of the firmware and/or software. Storage controller 110 implements the processes described herein by execution of instructions by the processor 130, by hardware, or by combinations thereof. Hardware can include various components of storage device controller 110, such as logic gates, switches, application specific integrated circuits (ASICs), programmable logic controllers, embedded microcontrollers, registers, and other components.

Storage device controller 110 may operate under the NVMe protocol, but other protocols are applicable. The NVMe protocol is a communications interface/protocol developed for SSDs to operate over a host and storage device linked over a PCIe interface. NVMe protocol provides a command queue and completion path for access of data stored in data storage device 102 by host 150. NVMe provides parallel, simultaneous access to the storage device 102 in a multi-processing-entity computational environment, such as an environment with multiple virtualized hosts 160, such as multiple VMs. While some embodiments are described with reference to VMs for clarity of description, the disclosure is operable with other forms of virtualized hosts. A virtualized host may be a VM, a container, and/or any other type of virtualized computing instance.

Storage device controller 110 also includes a memory access control module 120. Memory access control module 120 controls access to the memory of the storage device controller 110. Memory of storage device controller 110 can include dynamic random access memory (DRAM) 111, static random access memory (SRAM) 112, and registers 113. DRAM 111 and SRAM 112 are volatile memories or cache buffer(s) for short-term storage or temporary memory during operation of data storage device 102. Volatile memories do not retain stored data if powered off. DRAM requires periodic refreshing of stored data while SRAM does not require refreshing. SRAM provides faster access to data but is more expensive than DRAM. The CMB region is typically allocated in DRAM 111. Registers 113 includes flip-flops, latches, counters, and other registers.

NVM 106 of storage device 102 may be configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device 102 may also include other components, such as a NVM interface module 132, a direct memory access DMA module 133, a scheduler 134, an error correction module 136, a command parser 138, a command executor 140, and a control path 142. Flash interface module 132 interacts with NVM 106 for read and write operations. DMA module 133 executes data transfers between host 150 and storage device 102 without involvement from CPU 152. Scheduler 134 controls the data transfer while activating the control path for fetching physical page regions (PRPs), posting completion and interrupts, and activating the DMAs for the actual data transfer between host 150 and data storage device 102. Error correction module 136 corrects the data fetched from the memory arrays. Command parser 138 parses commands to command executor 140 for execution on flash interface module 132.

Figure 2:
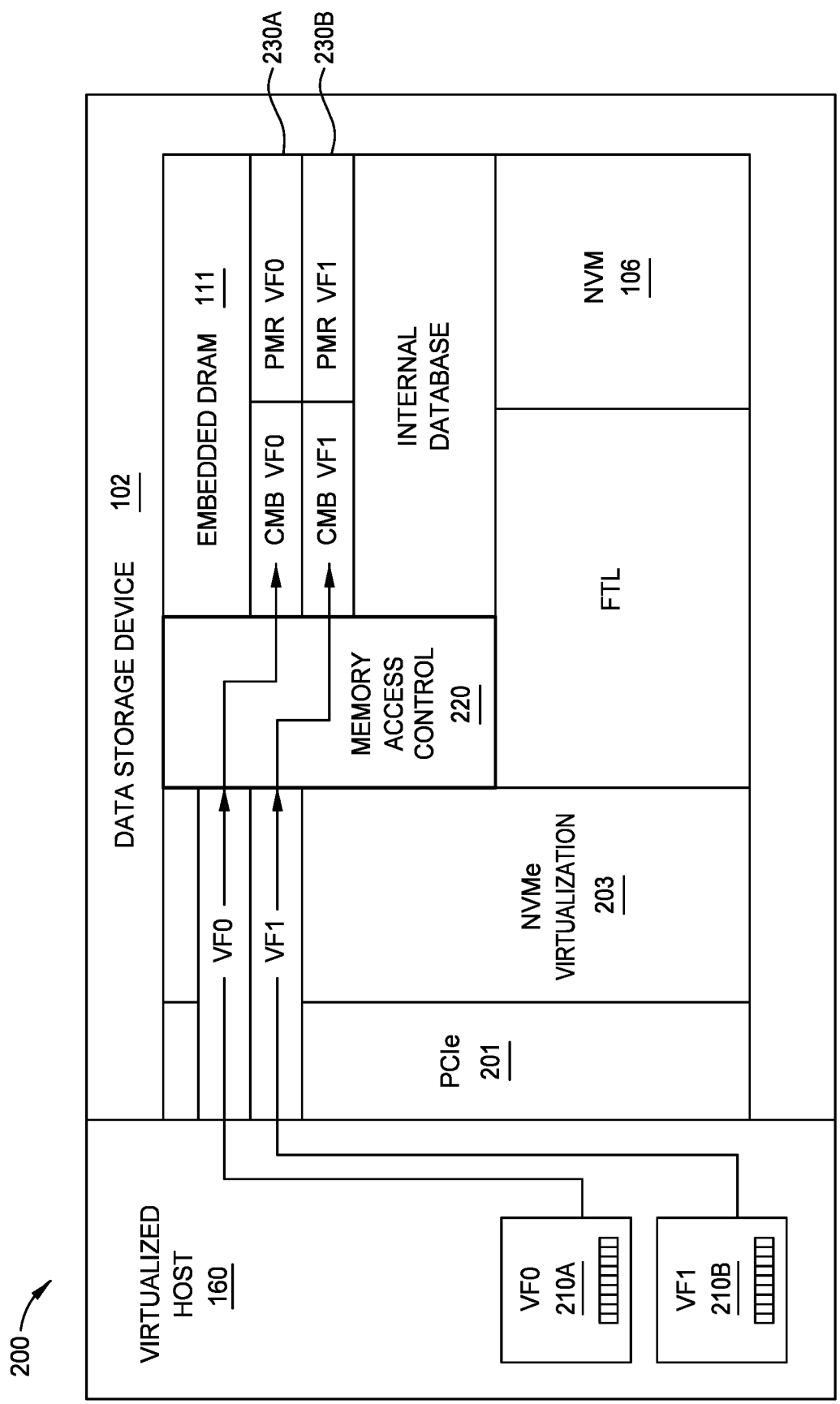
FIG. 2 illustrates certain embodiments of a virtualized computer system employing a controller memory buffer region within DRAM of a data storage device.

FIG. 2 illustrates certain embodiments of a virtualized computer system 200 employing a CMB region 230 within a DRAM 111 of a data storage device, such as DRAM 111 of data storage device 102 of virtualized computer system 100 of FIG. 1 or other suitable virtualized computer systems. For ease of description, virtualized computer system 200 has been described with like numerals from virtualized computer system 100 were appropriate.

Virtualized host 160 includes one or more VFs 210, such as a first VF (VF0) 210A and a second VF (VF1) 210B. The VFs 210 communicate through the PCIe hardware layer 201 and the NVMe protocol layer 203 of the storage device controller 110 (FIG. 1). The PCIe hardware layer 201 includes PCIe Phy, PCIe MAC, other hardware components, and other firmware components. The data storage device 102 includes volatile memory, such as DRAM 111.

The controller memory buffer (CMB) feature of NVMe enables virtualized host(s) 160 to store CMB and/or persistent memory region (PMR) (collectively referred to "CMB/PMR") transactions in the CMB region 230 of DRAM 111. Each VF 210 has a dedicated CMB region 230 within DRAM 111 of data storage device 102. The dedication CMB region 230 can defined by one or more PCIe base address registers (BARs) pointing to an address space of DRAM 111.

The dedicated CMB region 230 can be used to store CMB/PMR transactions, such as storing queues and storing user data. CMB/PMR transactions include submission queues (SQs), completion queues (CQs), physical region pages (PRP) lists, scatter gather list (SGL) segments, and user data. NVMe communication protocol of the NVMe layer 203 is based on a paired submission queue (SQ) and completion queue (CQ) mechanism. Commands are placed by host software into a SQ. Completions are placed into the associated CQ by storage device controller 110. PRP contain pointers indicating physical memory pages populated with user data or going to be populated with user data, such as for read or write commands in NVMe queues. SGL segments include pointers indicating the physical addresses of virtualized host memory space in which data should be transferred from for write commands and in which data should be transferred to for read commands. Data buffers may contain write data to be written to NVM 106 associated with a write command contain and/or read data from data storage device 102 associated with a read command.

The PMR is an optional region of the CMB region 230. Virtualized host 160 or VFs 210 may store data to the PMR for a variety of purposes. The contents of the PMR persists across PMR, storage device controller 110, and NVM 106 disables, resets, and power cycles. For example, the contents of the PMR are flushed to NVM 106 in the event of a power loss.

In addition to use for CMB/PMR transactions, DRAM 111 can be also used by data storage device 102 in various internal operations such as logical-to-physical address translation, read-look-ahead, caching/accumulating write data, and other internal data storage device operations. The DRAM 111 typically also includes internal databases, such as flash translation layer (FTL) tables used by the FTL of data storage device 102.

Date storage device 102 incorporates a memory access control module, such as a memory access control module 220, that schedules all transactions directed to memory of the storage device controller 110 (FIG. 1). Memory of the storage device controller 110 (FIG. 1) can include DRAM 111, SRAM 112 (FIG. 1), and registers 113 (FIG. 1). The clients of the memory access control module 220 included CMB/PMR transaction requests to DRAM 111 by virtualized host(s) 160, buffer/cache transactions requests to DRAM 111 by internal operations of data storage device 102, other requests to SRAM 112, and other requests to registers 113.

When implementing the CMB/PMR in DRAM 111, more clients are added (e.g. virtualized hosts 160) that may overload DRAM 111. Without the memory access control module 220, the extra accesses to DRAM 111 from virtualized hosts 160 may degrade overall performance of data storage device 102. In other data storage devices without the memory access control module 220, all CMB/PMR transactions of virtualized host are directed to DRAM 111 without having any access control which may negatively impact data storage device 102. For example, a misbehaved virtualized host 160 without the memory access control module 220 may negatively impact the performance of data storage device 102 and/or negatively impact the performance of the other well-behaved virtualized hosts. In another example, storage device controller without a memory access control module 220 may be exposed to security issues.

With memory access control module 220, in certain embodiments, all of the DRAM transactions that are initiated by either virtualized hosts 160 (e.g., CMB/PMR transaction) and by internal operations of data storage device 102 (e.g., access to FTL tables) are directed to the memory access control module 220. The memory DRAM access control module 220 schedules all CMB/PMR transactions issued by the virtualized hosts 160 and determines when these transactions are issued toward DRAM 111. In virtualized computer system 200, data storage device 102 is a slave to the master virtualized host 160. Data storage device 102 without a memory access control module cannot control the timing of receiving CMB/PMR transaction requests from virtualized host 160.

In contrast, memory access control module 220 determines when CMB/PMR transactions are issued toward DRAM 111. In one embodiment, memory access control module 220 determines when CMB/PMR transactions of store/write operations such as when commands are placed into SQs or when user data is placed into the CMB region 230, are issued toward DRAM 111. Once commands are placed into SQs of the CMB region 230, storage device controller 110 (FIG. 1) of data storage device 102 can load transactions of the queues from CMB region 230 by arbitration (e.g., static, round robin) that can be non-weighted or weighted priority (e.g., low, medium, high, strict). In another embodiment, memory access control module 220 determines with CMB/PMR transactions of load/read operations, such as when completion messages are read from CQs from the CMB region 230, are issued toward DRAM 111. In certain embodiments, all CMB/PMR transactions passes through the memory access control module 220 to control the workload on DRAM 111.

Figure 3:
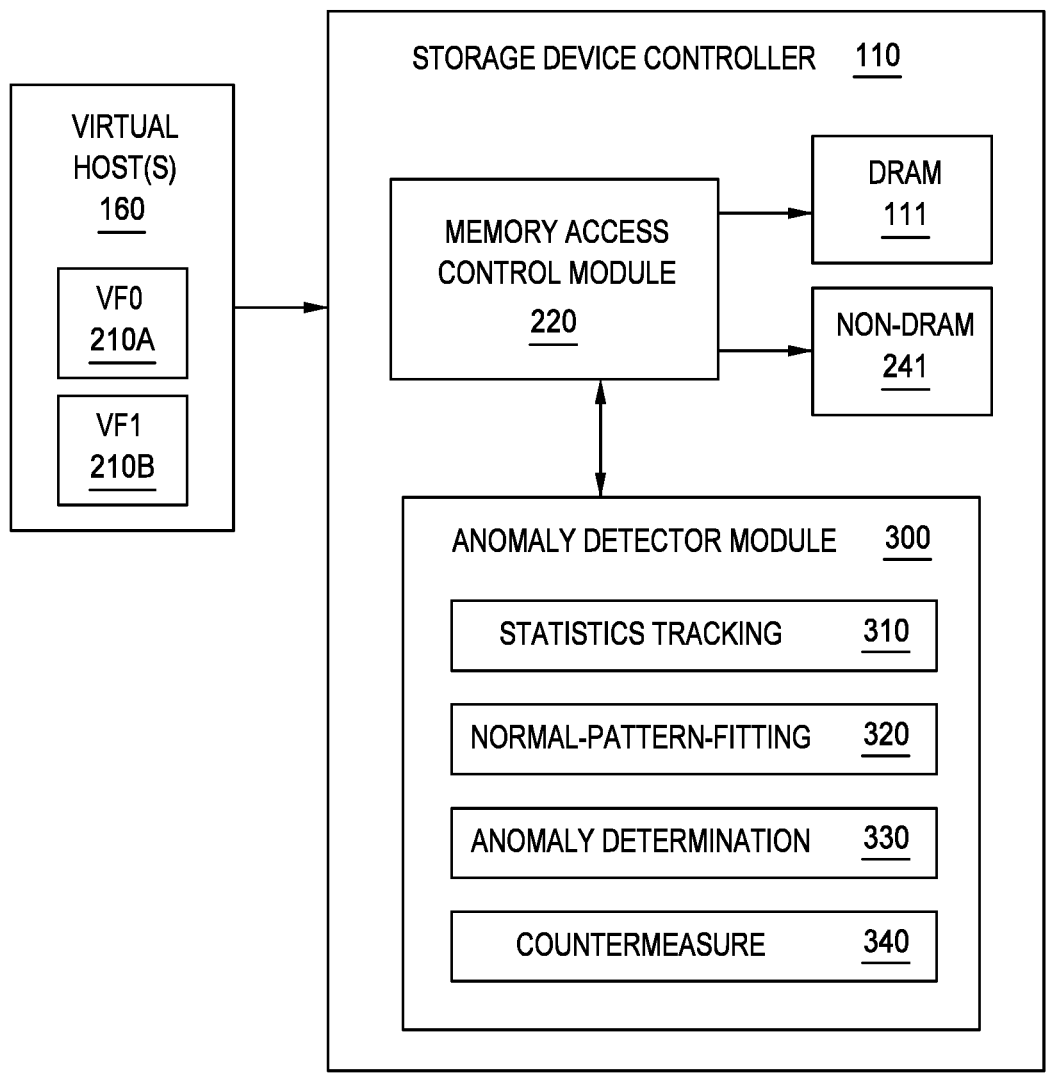
FIG. 3 illustrates certain embodiments of a storage device controller further comprising an anomaly detector module coupled in communication with a memory access control module.

FIG. 3 illustrates certain embodiments of a storage device controller 110 further comprising an anomaly detector module 300 coupled in communication with the memory access control module 220 of FIG. 2 or other suitable memory access control modules for other data storage drives. For ease of description, the anomaly detector module is described in reference to the memory access control module 220 of FIG. 2 but other memory access control modules can be applicable. The memory access control module 220 controls access to DRAM 111 and to non-DRAM 241. Non-DRAM 241 includes SRAM 112 and/or registers 113.

In certain embodiments, the anomaly detector module 300 comprises a statistics tracking sub-module 310. The statistics tracking sub-module tracks or monitors one or more parameters relating to transaction requests of DRAM 111 by virtualized host(s) 160. Examples of parameters relating to transaction requests from virtualized hosts 160 include a timing of a transaction request (e.g., when the transaction request occurs), a size of the data of the transaction, a source of the transaction request (e.g., virtualized host 160, VF 210), a type of access of the transaction (e.g., read access, write access), a pattern of the data written or read, and other suitable parameters.

In certain embodiments, the anomaly detector module 300 comprises a normal-pattern-fitting sub-module 320. The normal-pattern-fitting sub-module 320 determines a threshold for a normal behavior pattern. The threshold for a normal behavior pattern may be determined by the one or more parameters tracked by the statistics tracking sub-module 310, by user settings, and/or by vendor settings. The threshold for a normal behavior pattern may be updated as new information is accumulated from the statistics tracking sub-module 310.

In certain embodiments, the anomaly detector module 300 comprises an anomaly determination sub-module 330. The anomaly determination sub-module 330 determines whether a threshold for a normal behavior pattern has been exceeded for the threshold behavior pattern determined by normal-pattern-fitting sub-module 320. For example, anomaly determination sub-module 330 determines if a transaction is an outlier to the pattern determined by the normal-pattern-fitting sub-module 320. In certain embodiments, determining whether a threshold for a normal behavior pattern has been exceeded may by based on one or more of the following categories of techniques: an unsupervised learning operation (an operation based upon determining a pattern), an supervised learning operation (an operation based upon a data set example of both normal and abnormal transactions), a semi-supervised learning operation, a density-based technique (e.g. k-nearest neighbor, local outlier factor), subspace and correlation-based outlier detection for high-dimensional data, a one class support vector machine, a replicator neural network, cluster analysis-based outlier detection, a deviation from association rules and frequent item sets, fuzzy logic based outlier detection, an ensemble technique (e.g., using feature bagging, score normalization, different sources of diversity), and combinations thereof.

In certain embodiments, the anomaly detector module 300 comprises a countermeasure sub-module 340. The countermeasure sub-module 340 performs a countermeasure if a threshold has been determined to be exceeded by the anomaly determination sub-module 330. One example of a countermeasure includes providing an alert when a threshold is exceeded or an anomaly is detected. The alert may be sent to virtualized host 160 and/or to host 150, such as to a hypervisor running virtualized hosts 160. The alert may also include a confidence level of whether the anomaly detected is a low security risk, a medium security risk, or a high security risk. The alert may also enable feedback on whether virtualized host 160 and/or host 150 approves or disapproves of the suspicious transaction. Another example of a countermeasure includes selectively blocking an identified source, such as blocking virtualized host 160 and/or VF 210, of the problematic CMB/PMR transactions. Another example of a countermeasure includes selectively throttling or delaying access to an identified source, such as throttling access of virtualized host 160 and/or VF 210, of the detected anomaly. Another example of a countermeasure includes creating a log of the alerts and/or of the instances a threshold is exceeded or the instances an anomaly is detected.

Figure 4:
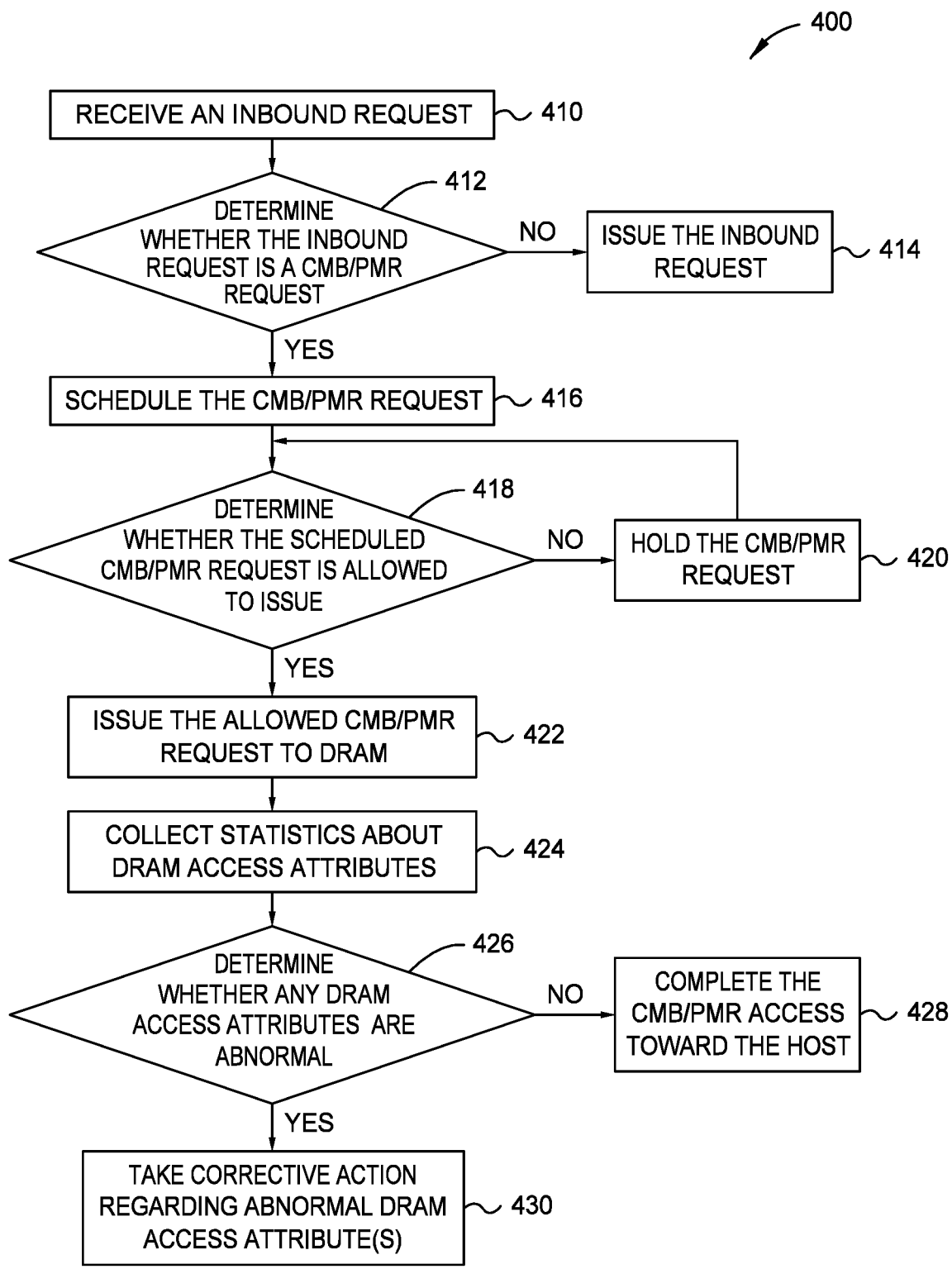
FIG. 4 is a flowchart illustrating certain embodiments of a process of issuing requests to memory of a data storage device.

FIG. 4 is a flowchart illustrating certain embodiments of a process 400 of issuing requests to memory of a data storage device, such as to DRAM 111, SRAM 112, registers 113, non-DRAM 241 of storage device controller 110 of data storage device 102 of FIG. 1, 2, or 3. Certain blocks of process 400 can be performed by the memory access control module 220 of FIG. 1, 2 or 3 with or without the anomaly detector module 300. For ease of description, process 400 will be described in reference to the memory access control module 220 of FIG. 1, 2, or 3 but other memory access control modules can be applicable.

At block 410, an inbound requested is received by the memory access control module 220 from VFs 210 (such as from the hypervisor) or from the internal operations of the data storage device 102 for access to memory of the data storage device 102. Virtualized hosts 160 can access the CMB region 230 of DRAM 111 by issuing PCIe memory read and write transactions toward the CMB/PMR address spaces which reside in one of the PCIe BARs. Each virtualized host 160 has its own dedicated CMB region 230 in DRAM 111.

At block 412, the memory access control module 220 determines whether the inbound request received at block 410 is a CMB/PMR transaction request from virtualized host 160. When the inbound request is determined by the memory access control module 220 to not be a CMB/PMR transaction request, process 400 proceeds to block 414. One example of a non-CMB/PMR transaction request is an inbound control access request from host 150 to access registers 113 and/or SRAM 112 of the storage device controller 110. Inbound control access request may be access requests of configuration settings/values of the data storage device 102. Another example of a non-CMB/PMR transaction request is an internal operations request from the data storage device 102 to access DRAM 111, such as to access FTL tables stored in DRAM 111.

At block 414, the inbound request from block 412 is issued to memory of the storage device controller (DRAM 111, SRAM 112, or registers 113) by the memory access control module 220 when the memory access control module determines that the inbound request is not a CMB/PMR transaction request. For example, non-CMB/PMR transaction requests from VFs 210 of control access requests are issued toward registers 113 and/or SRAM 112. For example, non-CMB/PMR transactions of internal operations requests from the data storage device 102 are issued toward DRAM 111. When the inbound request is determined by the memory access control module 220 to be a CMB/PMR transaction request, process 400 proceeds to block 416.

At block 412, inbound requests to memory of the storage device controller 110 are parsed. Inbound requests of control access of non-DRAM are promptly issued toward registers 113 and/or SRAM at block 414 since access to the non-DRAM does not impact the workload on DRAM 111. Inbound requests from internal operation of the data storage device 102 are promptly issued toward DRAM 111 at block 414 since the internal operations of the data storage device 102 have higher priority than CMB/PMR transaction requests from virtualized host 160. In certain aspects, inbound requests from internal operation of the data storage device 102 having higher priority than CMB/PMR transaction requests can reduce data security issues, increase fairness in a multi host/VF environment, and/or increase performance and quality of service of the data storage device 102 in comparison to having CMB/PMR transactions requests having higher priority than internal operations requests. CMB/PMR transaction requests from virtualized host 160 are withheld from immediate issuance toward the DRAM 111 and are further processed at block 416.

At block 416, the memory access control module 220 schedules the CMB/PMR transaction request from block 412. Whenever receiving a CMB/PMR transaction request issued from virtualized host 160 to CMB region 230, the request is first scheduled rather than transferring the request directly to DRAM 111, such as to a SQ, a CQ, or to a cache buffer.

At block 418, the memory access control module 220 determines whether the CMB/PMR transaction request is allowed to issue toward DRAM 111. When the memory access control module 220 determines that the CMB/PMR transaction request is allowed to issue, process 400 proceeds to block 422. When the memory access control module 220 determines that the CMB/PMR transaction request is not allowed to issue, process 400 proceeds to block 420.

In certain embodiments, the memory access control module 220 includes a credit-based system to determine whether to issue a CMB/PMR transaction request toward DRAM 111. In one example of a credit-based system, the memory access control module 220 allocates a certain amount of credits to a virtualized host 160 or VF 210 based upon attributes of the virtualized host or VF. The memory access control module 220 charges a certain amount of credits for a certain CMB/PMR transaction request. The memory access control module 220 determines whether the virtualized host 160 or VF 210 has enough credits for the CMB/PMR transaction request from block 416. If the virtualized host 160 or VF 210 has enough credits for the CMB/PMR transaction request, the CMB/PMR transaction request is allowed to issue at block 422 and the credits are deducted from the virtualized host 160 or VF 210. The credits can be return to the virtualized host 160 or VF 210 upon completion of the CMB/PMR transaction to DRAM 111 or upon elapse of a certain amount of time. If the virtualized host 160 or VF 210 does not have enough credits for the CMB/PMR transaction request, the CMB/PMR transaction request is held at block 420.

At block 420, the CMB/PMR transaction request from block 418 is held by the memory access control module 220. The memory access control module 220 may hold this CMB/PMR transaction request alone by itself or together with one or more other held CMB/PMR transaction requests. A held CMB/PMR transaction request proceeds back to block 418 to determine whether the held CMB/PMR transaction request is allowed to issue. The held request is postponed until the execution of the request is allowed to issue at block 418. Meanwhile, other CMB/PMR transaction requests from virtualized hosts 160/VF 210 and internal operations requests from data storage device 102 can be issued toward DRAM 111 allowing out-of-order execution of received requests to DRAM 111.

At block 422, the memory access control module 220 issues the allowed CMB/PMR transaction request toward DRAM. In certain embodiments of a credit-based system of block 418, deducted credits for a CMB/PMR transaction requests that is allowed to issue toward DRAM 111 can be return to the virtualized host 160 or VF 210 upon completion of the CMB/PMR transaction to DRAM 111 or upon elapse of a certain amount of time.

At block 424, an anomaly detector module 300 collects statistic about DRAM access attributes for each of virtualized hosts 160/VFs 210. For example, DRAM access attributes for virtualized hosts 160/VFs 210 include a timing of a transaction request (e.g., when the transaction request occurs), a size of the data of the transaction, a source of the transaction request (e.g., virtualized host 160, VF 210), a type of access of the transaction (e.g., read access, write access), a pattern of the data written or read, and other suitable parameters.

A block 426, the anomaly detector module 300 determines whether any DRAM access attributes are abnormal, such as whether a subset of the DRAM access attributes collected at block 424 is abnormal. When the anomaly detector module 300 does not determine that any DRAM access attribute is abnormal, the storage device controller 110 completes the CMB/PMR access toward the interface 156 of host 150 at block 428.

When the anomaly detector module 300 determines that a DRAM access attribute is abnormal, process 400 proceeds to block 430. Examples of abnormal DRAM access attribute include overloading DRAM 111 or issuing numerous unaligned transactions which are not optimized for DRAM 111.

At block 430, the anomaly detector module 300 takes corrective action when the anomaly detector module 300 determines that a DRAM access attribute is abnormal. In one example, the anomaly detector module 300 can report to host 150 about the abnormal behavior of a specific virtualized host 160/VF 210. In one example, the anomaly detector module 300 can disable a misbehaving virtualized host 160/VF 210.

Figure 5:
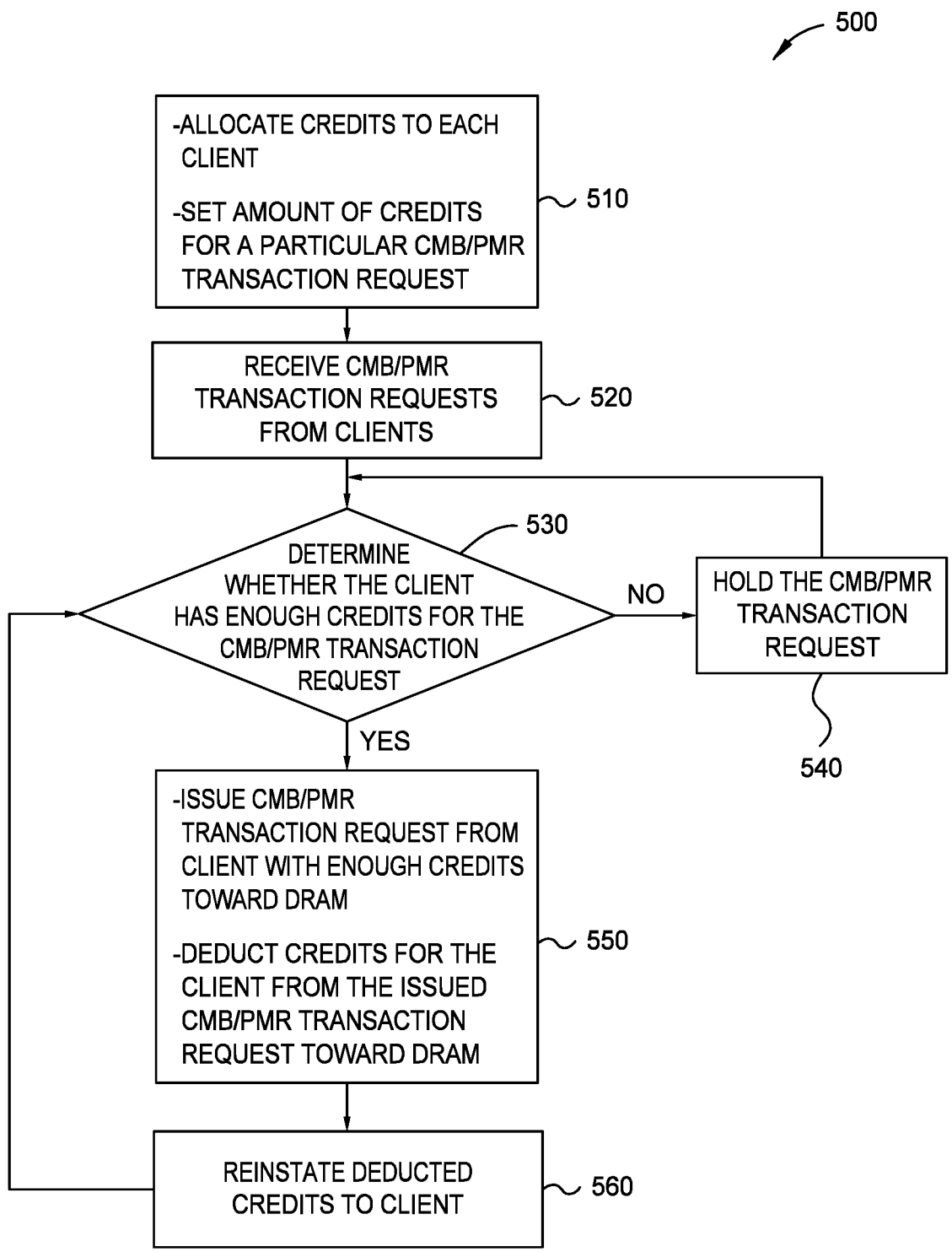
FIG. 5 is a flowchart illustrating certain embodiments of a process of scheduling CMB/PMR transaction requests based upon a credit-based system.

FIG. 5 is a flowchart illustrating certain embodiments of a process 500 of scheduling CMB/PMR transaction requests based upon a credit-based system. Certain blocks of process 500 can be performed by the memory access control module 220 of FIG. 2 or 3 with or without the anomaly detector module 300. For ease of description, process 500 will be described in reference to the memory access control module 220 of FIG. 1, 2 or 3 but other memory access control modules can be applicable.

At block 510, the memory access control module 220 allocates a certain amount of credits to each client (e.g., each VF 210) and sets an amount of credits to charge for a particular CMB/PMR transaction request to be allowed. Credit allocations and the number of credits required for each CMB/PMR transaction may be based on one or more of the following parameters: size of DRAM 111 allocated for each client, priority of each client, priority of the specific transaction, type of storage (e.g., whether type of storage is CMB or PMR), type of usage of the CMB region 230 (e.g., user data, queues), transfer type (e.g., aligned transfers, aligned transfer), transaction size, and timeout duration.

The memory access control module 220 can utilize the initialization setting (e.g., size of DRAM 111 allocated for each client, priority of each client) of a VF 210 to allocate a certain amount of credits to a VF 210 and/or to set an amount of credits to charge for a particular CMB/PMR transaction. Based upon one or more parameters of the initialization settings of a VF 210, the memory access control module 220 can correlate a corresponding quality of services requirements for each VF 210. For example, if a first VF 210A has a higher amount of allocated DRAM 111 than a second VF 210B, the memory access control module can allocate a greater amount of credits to the first VF 210A than the second VF 210B and/or set a lower amount of credits to charge for CMB/PMR transactions of the first VF 210A than the second VF 210B. For example, if a first VF 210A has a higher priority than a second VF 210B, the memory access control module can allocate a greater amount of credits to the first VF 210A than the second VF 210B and/or set a lower amount of credits to charge for CMB/PMR transactions of the first VF 210A than the second VF 210B.

The memory access control module 220 can utilize the priority of the specific transaction to allocate a certain amount of credits to a VF 210 and/or to set an amount of credits to charge for a particular CMB/PMR transaction. For example, read CMB/PMR transactions can be given higher priority than write CMB/PMR transactions due to the time sensitive nature of read transactions versus write transactions in terms of user experience. For example, the memory access control module can allocate a greater amount of credits to a first VF 210A than a second VF 210B in which the first VF 210A is primarily issuing read CMB/PMR transactions and in which the second VF 210B is primarily issuing write CMB/PMR transactions. In certain embodiments, the memory access control module can set a lower amount of credits to charge for read CMB/PMR transactions than write CMB/PMR transactions. In certain embodiments, the memory access control module can set a higher amount of credits to charge for read CMB/PMR transactions than write CMB/PMR transactions.

The memory access control module 220 can utilize whether the type of storage is CMB or PMR to allocate a certain amount of credits to a VF and/or to set an amount of credits to charge for a particular CMB/PMR transaction. For example, PMR transactions can be given higher priority than CMB transactions since the data of PMR transactions are to be flushed to NVM 106 in the event of power loss or resets. For example, the memory access control module can allocate a greater amount of credits to a first VF 210A than a second VF 210B in which the first VF 210 is primarily issuing PMR transactions and in which the second VF210B is primarily issuing CMB transactions. For example, the memory access control module can set a lower amount of credits to charge for PMR transactions than write CMB transactions.

The memory access control module 220 can utilize the type of usage of the CMB region 230 to allocate a certain amount of credits to a VF and/or to set an amount of credits to charge for a particular CMB/PMR transaction. For example, utilizing the CMB region 230 for user data can be given higher priority than utilizing the CMB region 230 for requests to SQs. For example, the memory access control module can allocate a greater amount of credits to a first VF 210A than a second VF 210B in which the first VF 210 is primarily issuing CMB/PMR transactions to load user data and in which the second VF210B is primarily issuing CMB/PMR transactions to place requests into SQs. For example, the memory access control module can set a lower amount of credits to charge for CMB/PMR transactions to load user data to DRAM than CMB/PMR transactions to place requests into SQs.

The memory access control module 220 can utilize the transfer type to allocate a certain amount of credits to a VF 210 and/or to set an amount of credits to charge for a particular CMB/PMR transaction. For example, aligned transfers to DRAM can be given higher priority than non-aligned transfers to DRAM due to extra processing required for non-aligned transfers. For example, the memory access control module can allocate a greater amount of credits to a first VF 210A than a second VF 210B in which the first VF 210A is primarily issuing aligned transfers and in which the second VF 210B is primarily issuing non-aligned transfers. For example, the memory access control module can set a lower amount of credits to charge for aligned transfers than for non-aligned transfers.

The memory access control module 220 can utilize the transaction size to allocate a certain amount of credits to a VF 210 and/or to set an amount of credits to charge for a particular CMB/PMR transaction. For example, larger transactions sizes to DRAM can be given higher priority than smaller transactions sizes to DRAM. For example, the memory access control module can allocate a greater amount of credits to a first VF 210A than a second VF 210B in which the first VF 210A is primarily issuing CMB/PMR transactions involving large transactions sizes and in which the second VF 210B is primarily issuing CMB/PMR transactions involving small transactions sizes. For example, the memory access control module can set a lower amount of credits to charge for a CMB/PMR transaction involving a large transactions size than for a CMB/PMR transaction involving a small transactions size.

For example, the memory access control module can give higher priority to access of larger amounts of data over less transactions. For example, in a read transaction of CMB region 230 of 1 KB, the memory access control module can give higher priority (i.e., charges less credits) to a single read transaction of 1 Kilobyte in size in comparison to a read transaction split over 8 transactions of 128 Bytes in size.

The memory access control module 220 can utilize a timeout setting of CMB/PMR transactions of a VF 210 to allocate a certain amount of credits to a VF 210 and/or to set an amount of credits to charge for a particular CMB/PMR transaction to avoid having timeout in host 150/VF 210. For example, short timeout durations can be given higher priority than long timeout durations. For example, the memory access control module can allocate a greater amount of credits to a first VF 210A than a second VF 210B in which the first VF 210A has a short timeout duration and in which the second VF 210B has a long timeout duration. For example, the memory access control module can set a lower amount of credits to charge for CMB/PMR transactions with a short timeout duration than for CMB/PMR transactions with a long timeout duration.

At block 520, CMB/PMR transaction requests are received by the memory access control module 220 from the clients. Instead of immediately issuing the CMB/PMR transaction requests toward DRAM240, the process 500 proceeds to block 530.

At block 530, the memory access control module 220 determines whether the CMB/PMR transaction request has enough credits for the particular CMB/PMR transaction. The memory access control module 220 is configured to selectively interrupt CMB/PMR transaction requests from VFs 210 based on an amount of remaining credits allocated to the specific VF 210. The CMB/PMR transaction request is issued to DRAM 111 if VF 210 has enough credits. The memory access control module 220 is configured to selectively interrupt CMB/PMR transaction requests from VFs 210 to DRAM 111 based on an amount of remaining credits allocated to the specific VFs.

If the memory access control module 220 determines that the VF 210 does not have enough credits for the particular CMB/PMR transaction request, process 500 proceeds to block 540. At block 540, the memory access control module 220 holds the CMB/PMR transaction request until the memory access control module determine that the VF 210 has enough credits.

When the memory access control module 220 determines that the VF 210 has enough credits for the particular CMB/PMR transaction request, process 500 proceeds to block 550.

At block 550, the CMB/PMR transaction request from the VF 210 with enough credits is allowed to issue toward DRAM 111. The credits for the allowed CMB/PMR transaction request is deducted from the credits allocated to VF 210 at block 510. Issuing a CMB/PMR transaction request toward DRAM 111 consumes a certain amount of credits as set at block 510. The DRAM control module 220 determines a remaining amount of credits allocated to VF 210 after deduction or subtraction for the allowed CMB/PMR transaction request toward DRAM 111.

At block 560, the credits deducted at block 550 are reinstated by the memory access control module 220 to VF 210. In one example, the credits can be reinstated to VF 210 after completion of the particular issued CMB/PMR transaction to DRAM 111, such as when the completion of the CMB/PMR transaction has been submitted to a CQ. In another example, the credits can be reinstated to VF 210 after a certain time period has elapsed. The remaining amount of credits allocated to VF 210 at block 560 can be utilized at block 530 to determine if VF 210 has enough remaining for another CMB/PMR transaction request received at block 520 or for another CMB/PMR transaction request held at block 540.

With a memory access control module, such as memory access control module 220 of FIG. 2 or FIG. 3, performing process 400 and/or process 500, multiple VFs 210 can issue CMB/PMR transactions requests to DRAM 111 while providing high performance of VFs 210 and high performance of data storage device 102. In certain embodiments, the memory access control module 220 can provide more bandwidth to DRAM 111 for internal operations of the data storage device 102 in comparison to VFs 210. In certain embodiments, the memory access control module 220 can provide more bandwidth to DRAM 111 for well-behaving VF(s) 210 in comparison to a misbehaved VF 210. The memory access control module 220 allows out of order execution of CMB/PMR transaction requests across the PCIe layer 201 that would otherwise be determined by automatic placement into DRAM without a memory access control module 220.

In certain embodiments, memory access control logic is placed in the inbound path of CMB/PMR transaction requests, such as all PCIe CMB/PMR transactions initiated by VFs 210. Before sending the inbound CMB/PMR transactions to the relevant volatile memory, the CMB/PMR transactions are parsed and scheduled by the memory access control logic. The memory access control logic can provide out-of-order completion of PCIe transactions. PCIe transaction requests can be issued toward volatile memory based upon a quality of service requirements of the VFs 210 and the data storage device 102. Some PCIe transaction requests can be delayed from being issued toward volatile memory to favor other PCIe transactions requested issued toward volatile memory. In certain aspects, memory access control logic increases the security of the data storage device 102 by disabling access to volatile memory from a misbehaved VF 210. In certain aspects, memory access control logic increases the performance of the data storage device 102 by minimizing the influence of one VF 210 on another VF 210 in terms of sharing data storage device 102 in a virtualized computing environment. In certain aspects, volatile memory access control logic provides high performance of the data storage device 102 by ensuring sufficient volatile memory bandwidth, such as DRAM bandwidth, to internal operations of data storage device 102.

In one embodiment, a method provides access to a data storage device from a host coupled to the data storage device. The host is running a plurality of virtual functions. The method includes receiving an inbound request to a memory of a storage device controller of the data storage device. The memory of the storage device controller includes a DRAM memory and a non-DRAM memory. Whether the inbound request is a CMB/PMR transaction request is determined. The CMB/PMR transaction request is scheduled. Whether the scheduled CMB/PMR transaction request is allowed is determined. The allowed CMB/PMR transaction request is issued toward the DRAM memory of the storage device controller.

In another embodiment, a data storage device includes a PCIe interface configured to be coupled to a PCIe interface of a host running a plurality of virtual functions. The data storage device further includes a storage device controller. The storage device controller includes a memory and a memory access control module. The memory of the storage device controller includes DRAM memory and non-DRAM memory. The memory access control module is configured to receive an inbound request to the memory of the data storage device. The memory access control module is configured to determine whether the inbound request is a CMB/PMR transaction request. The memory access control module is configured to schedule the CMB/PMR transaction request. The memory access control module is configured to determine whether the scheduled CMB/PMR transaction request is allowed. The memory access control module is configured to issue the allowed CMB/PMR transaction request toward the DRAM memory.

In still another embodiment, a data storage device includes a PCIe interface configured to be coupled to a PCIe interface of a host running a plurality of virtual functions. The data storage device further includes non-volatile memory and a storage device controller. The storage device controller includes a memory and a memory access control means. The memory access control means issues CMB/PMR transaction requests to the memory in an out-of-order sequence. The memory access control means is between the PCIe interface of the data storage device and the memory.

While the foregoing is directed to embodiments of the present disclosure, other and further embodiments of the disclosure may be devised without departing from the basic scope thereof, and the scope thereof is determined by the claims that follow.

What is claimed is:

1. A method of providing access to a data storage device from a host coupled to the data storage device in which the host is running a plurality of virtual functions, wherein each virtual function of the plurality of virtual functions has a dedicated controller memory buffer (CMB) region within a DRAM of the storage device, the method comprising:
   receiving an inbound request to a memory of a storage device controller of the data storage device, the memory of the storage device controller comprising a DRAM memory and a non-DRAM memory;
   determining whether the inbound request is a controller memory buffer/persistent memory region (CMB/PMR) transaction request;
   scheduling the CMB/PMR transaction request;
   determining whether the scheduled CMB/PMR transaction request is allowed based on quality of service (QoS) impact of the scheduled CMB/PMR transaction request on the data storage device, the QoS impact based on at least one of timing, size, source, access type, and pattern of data written or read, of the CMB/PMR transaction request;
   issuing the allowed CMB/PMR transaction request toward the DRAM memory of the storage device controller;
   collecting statistical information about DRAM access attributes of the CMB/PMR transaction requests, wherein the statistical information comprises one of timing of the CMB/PMR transaction request, size of data of the CMB/PMR transaction request, source of CMB/PMR transaction request, a type of access of the CMB/PMR transaction request, or a pattern of data in the CMB/PMR transaction request; and
   determining a subset of a plurality subsets of the DRAM access attributes is abnormal;
   identifying an abnormal virtual function of the plurality of virtual functions based on the abnormal DRAM access attributes; and
   disabling the abnormal virtual function from accessing the DRAM of the storage device, while continuing to permit the remaining virtual functions of the plurality of virtual functions to access the DRAM of the storage device.

2. The method of claim 1, further comprising issuing the inbound request to a non-DRAM memory of the storage device controller when the inbound request is determined to not be a CMB/PMR transaction request.

3. The method of claim 2, wherein the inbound request is a control access request from the host of the non-DRAM memory of the storage device controller.

4. The method of claim 2, wherein the inbound request is an internal operation request from the data storage device of the DRAM memory of the storage device controller.

5. The method of claim 1, further comprising holding the scheduled CMB/PMR transaction request when the scheduled CMB/PMR transaction request is not allowed to issue.

6. The method of claim 5, further comprising:
   determining whether the held CMB/PMR transaction request is allowed; and
   issuing the held CMB/PMR transaction request toward the DRAM memory.

7. A data storage device, comprising:
   a PCIe interface configured to be coupled to a PCIe interface of a host running a plurality of virtual functions;
   non-volatile memory; and
   a storage device controller comprising:
      a memory;
      a memory access control module; and
      an anomaly detector module coupled to the memory access control module,
   wherein the memory of the storage device controller comprises a DRAM memory and a non-DRAM memory,
   wherein each virtual function of the plurality of virtual functions has a dedicated controller memory buffer (CMB) region within the DRAM memory of the storage device controller, and
   wherein the memory access control module is between the PCIe interface of the data storage device and the DRAM memory, wherein the memory access control module is configured to:
      receive an inbound request to the memory of the storage device controller;
      determine whether the inbound request is a controller memory buffer/persistent memory region (CMB/PMR) transaction request;
      schedule the CMB/PMR transaction request;

determine whether the scheduled CMB/PMR transaction request is allowed based on quality of service (QoS) impact of the scheduled CMB/PMR transaction request on the data storage device, the QoS impact based on at least one of timing, size, source, access type, and pattern of data written or read, of the CMB/PMR transaction request; and issue the allowed CMB/PMR transaction request toward the DRAM memory; and collect statistical information about DRAM access attributes of the CMB/PMR transaction requests, wherein the statistical information comprises one of timing of the CMB/PMR transaction request, size of data of the CMB/PMR transaction request, source of CMB/PMR transaction request, a type of access of the CMB/PMR transaction request, or a pattern of data in the CMB/PMR transaction request, wherein the anomaly detector module is configured to:

determine a subset of a plurality of subsets of the DRAM access attributes is abnormal;

identify an abnormal virtual function of the plurality of virtual functions based on the abnormal DRAM access attributes; and disable the abnormal virtual function from accessing the DRAM of the data storage device, while continuing to permit the remaining virtual functions of the plurality of virtual functions to access the DRAM of the storage device.

8. The data storage device of claim 7, wherein the memory access control module is further configured to issue the inbound request to the non-DRAM memory of the storage device controller when the inbound request is determined to not be a CMB/PMR transaction request.

9. The data storage device of claim 8, wherein the inbound request is a control access request of the non-DRAM memory of the storage device controller.

10. The data storage device of claim 8, wherein the inbound request is an internal operation request from the data storage device of the DRAM memory of the storage device controller.

11. The data storage device of claim 7, wherein the memory access control module is further configured to hold the scheduled CMB/PMR transaction request when the scheduled CMB/PMR request is not allowed to issue.

12. The data storage device of claim 11, wherein the memory access control module is further configured to:

determine whether the held CMB/PMR transaction request is allowed; and issue the held CMB/PMR transaction request toward the DRAM memory.

13. A data storage device, comprising:

a PCIe interface configured to be coupled to a PCIe interface of a host running a plurality of virtual functions;

non-volatile memory; and a storage device controller comprising a memory access control means for issuing controller memory buffer/persistent memory region (CMB/PMR) transaction requests to the memory in an out-of-order sequence based on quality of service (QoS) impact of the CMB/PMR transaction requests on the data storage device, the QoS impact based on at least one of timing, size, source, access type, and pattern of data written or read, of the CMB/PMR transaction requests, the memory comprising a DRAM memory and a non-DRAM memory, wherein each virtual function of the plurality of virtual functions has a dedicated controller memory buffer (CMB) region within the DRAM memory of the storage device controller, the memory access control means is between the PCIe interface of the data storage device and the memory, and collecting statistical information about DRAM access attributes of the CMB/PMR transaction requests made to the DRAM, wherein the statistical information comprises one of timing of the CMB/PMR transaction request, size of data of the CMB/PMR transaction request, source of CMB/PMR transaction request, a type of access of the CMB/PMR transaction request, or a pattern of data in the CMB/PMR transaction request; and an anomaly detector means for collecting access attributes of the DRAM memory from the plurality virtual functions; determining a subset of a plurality of subsets of the DRAM access attributes is abnormal; determining an abnormal virtual function of the plurality of virtual functions based on the abnormal subset of the DRAM access attributes, and disabling one of the plurality of CMB regions associated with the abnormal virtual function from accessing the DRAM of the data storage device, while continuing to permit the remaining CMB regions of the plurality of CMB regions associated with the remaining virtual functions to access the DRAM of the storage device.

14. The data storage device of claim 13, wherein an NVM Express communications protocol is running over the PCIe interface of the data storage device.

* * * * *